United States Patent [19]

Kindle

[11] 4,131,293
[45] Dec. 26, 1978

[54] RETRACTABLE SERVICE LADDER

[75] Inventor: John J. Kindle, Bettendorf, Iowa

[73] Assignee: International Harvester Company, Chicago, Ill.

[21] Appl. No.: 842,446

[22] Filed: Oct. 14, 1977

[51] Int. Cl.² .............................................. B60R 3/02
[52] U.S. Cl. ................................................ 280/166
[58] Field of Search ................... 280/166; 182/97, 98, 182/91

[56] References Cited

U.S. PATENT DOCUMENTS

| 2,967,584 | 1/1961 | Westerlund | 182/97 |
| 3,554,320 | 1/1971 | Eggert, Jr. et al. | 182/98 X |

FOREIGN PATENT DOCUMENTS

| 2111140 | 9/1971 | Fed. Rep. of Germany | 182/97 |
| 1565792 | 5/1969 | France | 182/97 |

Primary Examiner—Joseph F. Peters, Jr.
Assistant Examiner—Norman L. Stack, Jr.
Attorney, Agent, or Firm—Douglas W. Rudy; Ronald C. Kamp; F. David AuBuchon

[57] ABSTRACT

A stowable ladder for use on a combine is provided with a spring assisted overcentering linkage that will maintain the foldable ladder in either a deployed status or closed status until significant manual effort overcoming the spring loaded overcentering linkage is induced.

12 Claims, 6 Drawing Figures

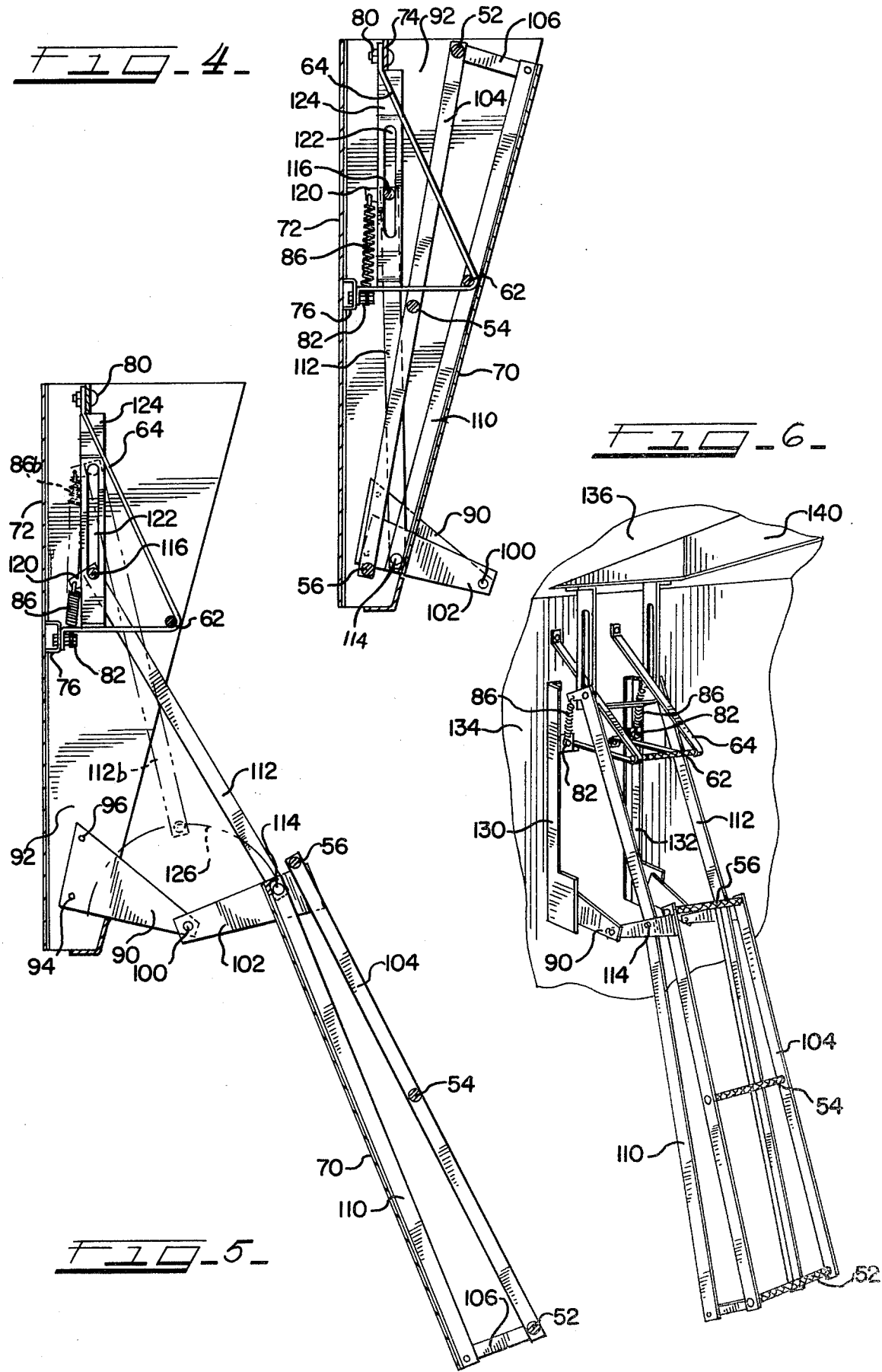

RETRACTABLE SERVICE LADDER

BACKGROUND OF THE INVENTION

1. Field of the Invention

The invention is a ladder for use on a combine providing access to an engine servicing platform. The folding ladder incorporates a spring biased overcentering linkage that will hold the ladder in a stowed or closed position without the need of a separate latching mechanism. The overcentering linkage also prevents the accidental folding of the ladder at inopportune times.

2. Description of the Prior Art

Ladders generally in use on combines or similar large equipment seldom are foldable and stowable in the manner of the ladder presented herein. Typically ladders in this equipment field are relatively short, on the order of three or four steps, therefore it is often more convenient to provide a ladder integral with the vehicle or one that swings or pivots into a position of storage. Several folding step arrangements are old in the art. Also ladders that fold into or against a vehicle body are known. Many embodiments utilizing tracks to align a ladder into a storage hold are also known in the art.

The invention presented herein appears to be unique in the combination of advantages it presents. None of the prior art devices known to the applicant possess the entire structure of this invention although his knowledge can not be construed as being all inclusive due to the potential extensiveness of the folding ladder art.

SUMMARY OF THE INVENTION

A ladder is provided that may be pivotally hung on a combine in order to provide access to a servicing platform or catwalk. In this invention a lower pivot point is cantilevered away from the body or sheet metal of the combine. The actual step portion of the ladder is pivotally hung from this pivot point by means of a hinge leaf having substantial length in order to position the ladder away from the combine body.

A support strap is pivotally mounted to the top of the step portion of the ladder. A second end of the support strap is contained, by an upper support strap pin, to a linkage member having an elongated slot fixed to the combine. The support strap is guided along the linkage member through the engagement of the strap pin with the elongated slot as the step portion is opened or closed although it is restrained in movement by a spring carried between the support strap and the combine. This linkage provides an overcentering linkage that will tend to prevent either the opening or closing of the ladder unless such action is operator initiated.

A fixed upper rung may be mounted to the combine directly.

It is an object of this invention to provide an access ladder that may be carried on a vehicle in a stowed position when not needed and easily shifted deployed position when needed. Further it is desirable to provide a stowable ladder that can be easily and quickly stowed and maintained in position without complex latching mechanisms.

Another object of this invention is to provide a ladder that when stowed is integrated into the sheet metal sculpture of the surrounding body work. This object is related to the desirability of providing a combine ladder that does not extend the overall length of the combine and thus does not interfere with field operations.

BRIEF DESCRIPTION OF THE INVENTION

FIG. 4 is a section view of the folding ladder of this invention in a stowed or closed position.

FIG. 5 is a section view of the ladder of FIG. 4 in an open position and including a broken line representation of a portion of the linkage and its overcenter travel route.

FIG. 6 is a folding ladder in a deployed position mounted below a ceiling panel access port.

DETAILED DESCRIPTION OF THE INVENTION

Figure 1:
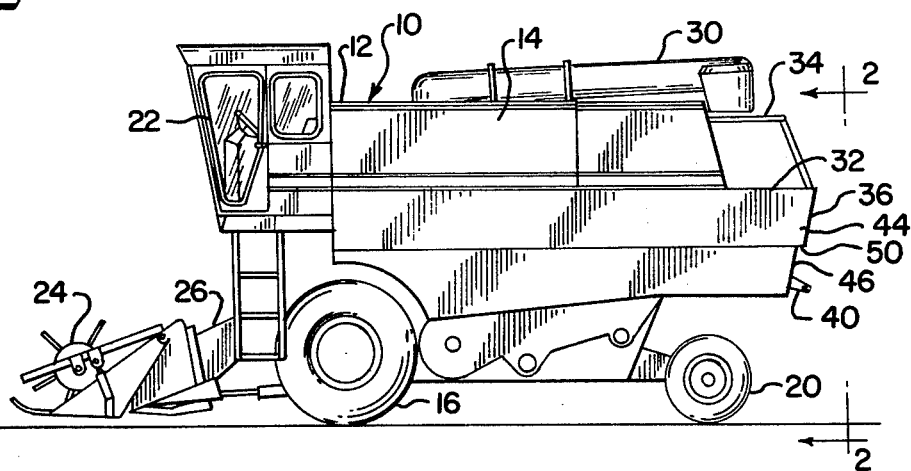
FIG. 1 is a side elevation view of a combine incorporating this invention.

The invention disclosed herein may reside in and be used on a large motive vehicle such as the combine shown generally as 10. This vehicle would typically include a chassis or body 12 having vertical side walls 14. The body being supported on a pair of large driven wheels 16 at the front of the combine 10 and a pair of steerable wheels 20 at the rear thereof. An operator's platform and cab 22, a crop gathering header 24, a feeder 26 and a grain delivery chute 30 are located on the chassis in conventional positions. An engine service and access catwalk or platform 32 having a guard rail 34 is provided at the back end 36 of the combine. Seen protruding from the back end of the combine is the ladder hinge 40.

Figure 2:
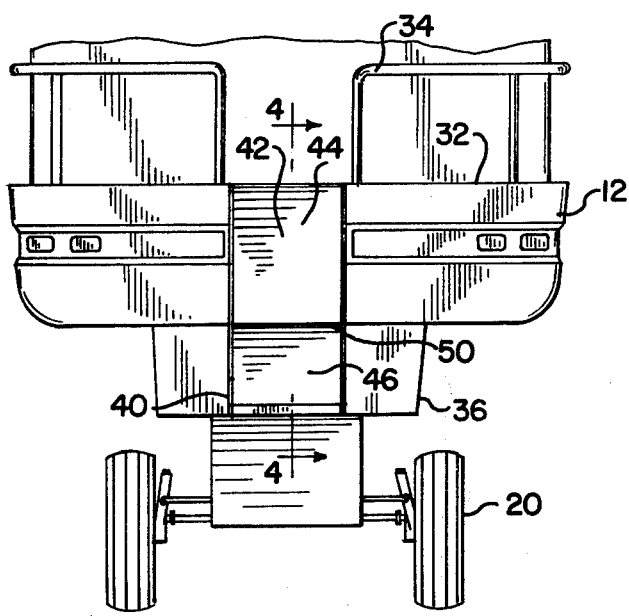
FIG. 2 is an elevation view of the rear portion of the combine of FIG. 1 with the folding ladder in a stowed position.
Figure 3:
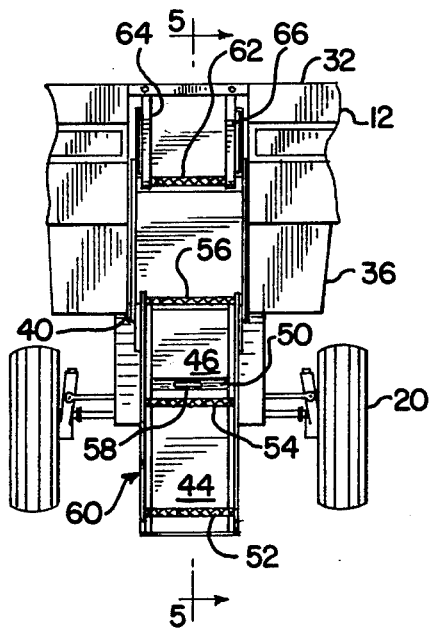
FIG. 3 is an elevation view of the rear portion of the combine with the folding ladder in a deployed position.

In FIGS. 2 and 3 the back end of the combine is presented to show the closed or stowed and open configurations of the foldable ladder respectively. The back end 36 of the combine is supported on the previously mentioned steerable wheels 20. The engine service and access platform 32 and the guard rail 34 (FIG. 2 only) are shown integral with the chassis 12. The folding ladder hinge 40, actually the ladder has a pair of hinges, is shown in these views although due to the small scale of the drawings the hinge detail is obscured in these views.

In order to consistently identify the upper or top part designations from lower or bottom part designations it has been decided to consider the stowable ladder as if it were in a deployed or open position as shown in FIGS. 3, 5 and 6. Thus, for instance, rung 52 in FIG. 3 is the lowest rung even though it could be considered the uppermost rung when the ladder is stowed or closed as in FIGS. 1 and 2.

In FIG. 2 it should be emphasized that the observable portion of the ladder comprises a sheet metal panel 42 having a first portion 46 and a second portion 44. The first portion 46 is relatively inboard of the second portion 44 in order to follow the body line of the sheet metal. A transition panel 50 connects the edge of the second portion 44 to the edge of the first portion 46 as shown in FIG. 1. An aperture serving as a grab handle may be formed through the transition panel.

FIG. 3, showing the folding ladder in a deployed position, reveals rungs 52, 54 and 56 which are integral with the ladder frame generally 60. Chassis mounted rung 62, which is supported via brackets 64 and 66 to the frame or body of the vehicle, is also shown.

The actual functional parts of a stowable ladder embodiment can best be seen in FIGS. 4, 5 and 6. FIGS. 4 and 5 would be similar, but not actually the same as, the section line views identified as 4—4 and 5—5 of FIGS. 2 and 3 respectively. This alternative embodiment is identical to that illustrated in FIGS. 1-3 except it is provided with a straight or flat sheet metal back panel 70 in order to illustrate another embodiment. Operating components are otherwise the same and have been assigned identical reference numbers to avoid undue complication. Dissimilar components have been assigned new unique reference characters as required.

In FIGS. 4 and 5 the folding ladder is mounted to a surface 72 which for example would be the back end of the combine. The chassis mounted rung 62 is held by the rung bracket 64 and a second rung bracket not seen in this view. The rung bracket 64 is suitably fastened to chassis integral supports 74 and 76 for instance by fasteners 80 and 82 respectively. Fastener 82 also provides a mounting or grounding point for spring 86.

The linkage and structure of the folding part of the ladder includes a pivot point support 90 which would be mounted to a structural member 92 integral with the wall surface 72 such as by bolts 94 and 96 or other suitable means such as welding. This support 90 includes a pivot point axle 100 which provides a pivotal mounting point for the hinge leaf 102. These components make up the folding ladder hinge 40 discussed earlier.

Each (of a pair) hinge leaf 102 carries a rung carrier 104 which supports rungs 52, 54 and 56 between rung carriers 104. Spreader 106 holds the rung carriers 104 away from frame 110 which locates sheet metal back panel 70. This spreader provides toe room between the two lowest rungs and the panel 70. The frame 110 is fixedly mounted to the hinge leaf 102.

Support strap 112 is pivotally mounted at pivot point 114 to the hinge leaf 102. The support strap 112 further includes a upper support strap pin 116 and an apertured tab 120 to accommodate a second end of spring 86. The upper support strap pin 116 is slideably engaged to the slot 122 in linkage member 124 which is fixedly mounted at its lower end to the rung bracket 64 and shares the upper mounting fastener 80 of the rung bracket.

The broken line representation of the support strap notated 112b in FIG. 5 corresponds to the halfway closed position of the ladder as does the broken line representation of the fully extended spring 86b.

The broken line arc 126 represents the path that pivot point 114 will follow as the ladder is being folded or closed. As this pivot point 114 goes over center, that is, beyond the position shown in the broken line representation, the spring 86 will bias the structure such that the ladder is maintained in either the stowed or closed position or the deployed position. If this spring is strong enough a separate latching mechanism may not be needed.

FIG. 6 presents a perspective view of the deployed ladder as it could be used to provide ingress or egress from a manhole or alternatively in another embodiment from a ceiling. In this embodiment mounting brackets 130 and 132 are fastened to a wall surface 134 and the pivot point support 90 would be carried on these mounting brackets. The ceiling surface 136 would be provided with a suitable aperture 140 to allow passage there through. In this embodiment the frame doesn't support a back panel as in the prior embodiments as this would not be necessary in many applications.

Other embodiments presenting or refining minor aspects of this invention are possible and have been contemplated. For instance, it is highly likely that the pivot point supports 90 rather than being bolted to the structural member 92 could be equipped with a flanged surface having holes for accommodating fasteners. This "L" shaped bracket would be bolted to the sheet metal body work adjacent the ladder cavity with the flange against the sheet metal. This alternative embodiment would be more desirable in some instances and/or less desirable in other instances.

It is apparent that an invention fully satisfying the objects and advantages set forth above is presented by this disclosure. Although several embodiments have been presented it should be apparent to persons of skill in the art that modifications and variations to these embodiments resulting in alternative structures would be possible. Accordingly this disclosure is intended to embrace nuances of design falling within the spirit and scope of the appended claims.

What is claimed is:

1. In a combine having an access platform integral with a combine body, a stowable access ladder comprising:
    a ladder frame pivotally mounted to said combine body below said access platform, said ladder frame including a pair of hinge leaves having apertured ends, the hinge leaves being elongated brackets acting as spacing members locating said ladder away from said combine body, a pair of frame members one fixed at an upper end thereof to each hinge leaf, a pair of rung carriers, one fixed at an upper end thereof to each hinge leaf, a pair of spreaders each spaced between the lower ends of said frame members and said rung carriers, a plurality of rungs spaced between each of said rung carriers between the lower end and the upper end of said rung carriers;
    a linkage member having an elongated longitudinal slot in a midsection thereof fixedly mounted in vertical alignment to said combine body below said access platform and above said pivotal mounting of said ladder frame;
    a support strap having an integral upper support strap pin and an integral tab, the support strap pivotally attached at a lower end thereof to said ladder frame and having the pin slidably carried in said slot of said linkage member at an upper end thereof;
    a spring grounded to said combine body at a point below the lower termination point of said elongated slot of said linkage member and attached to said tab of said support strap, whereby
    said spring is relatively relaxed when said ladder frame has been pivoted to a fully deployed position corresponding to said upper support strap pin being at the lower extreme of the slot of said linkage member and said spring is partially extended when said ladder frame is in a stowed position where said upper support strap pin is in the middle of said slot.

2. The invention in accordance with claim 1 wherein said frame members are straight throughout their length.

3. The invention in accordance with claim 2 wherein back panel is affixed simultaneously to said frame members between the upper and lower ends thereof.

4. The invention in accordance with claim 3 wherein said back panel is a flat sheet of material.

5. The invention in accordance with claim 1 wherein each of said frame members have a straight upper portion, a transitional portion angled away from the longitudinal axis of the straight upper portion and a straight lower portion angled away from the longitudinal axis of the transitional portion.

6. The invention in accordance with claim 5 wherein said back panel comprises:
 a first portion back panel affixed to the straight upper portions of said frame members;
 a transition panel, having a grab aperture, attached to said transition portions of said frame members; and
 a second portion back panel affixed to the straight lower portions of said frame members.

7. In a self-propelled combine having an access platform integral with a combine body the improvement comprising:
 a ladder cavity in the body of the combine having a vertical rear panel and vertical side panels;
 a ladder frame pivotally mounted to said combine body stowable in said ladder cavity of said body, said ladder frame including a pair of hinge leaves having apertured ends, the hinge leaves being elongated brackets acting as spacing members locating said ladder away from said combine body, a pair of frame members one fixed at an upper end thereof to each hinge leaf, a pair of rung carriers, one fixed at an upper end thereof to each hinge leaf, a pair of spreaders each spaced between the lower ends of said frame members and said rung carriers, a plurality of rungs spaced between each of said rung carriers between the lower end and the upper end of said rung carriers;
 a linkage member having an elongated slot in a midsection thereof fixedly mounted in vertical alignment on said vertical rear panel of said indentation below said access platform and above said pivotal mounting of said ladder frame;
 a support strap having an integral upper support strap pin and an integral tab, the support strap pivotally attached at a lower end thereof to said ladder frame and having the upper pin slidably carried in said slot of said linkage member at an upper end thereof;
 a spring grounded to said combine body at a point below the lower termination point of said elongated slot of said linkage member and attached to said tab of said support strap, whereby
 said spring is relatively relaxed when said ladder frame has been pivoted to a fully deployed position corresponding to said upper support strap pin at the lower extreme of the slot of said linkage member and said spring is partially extended when said ladder frame is in a stowed position within said body indentation when said upper support strap is in the middle of the slot.

8. The invention in accordance with claim 7 wherein said frame members are straight throughout their length.

9. The invention in accordance with claim 7 wherein back panel is affixed simultaneously to said frame members between the upper and lower ends thereof.

10. The invention in accordance with claim 7 wherein said back panel is a flat sheet of material.

11. The invention in accordance with claim 7 wherein each of said frame members have a straight upper portion, a transitional portion angled away from the longitudinal axis of the straight upper portion and a straight lower portion angled away from the longitudinal axis of the transitional portion.

12. The invention in accordance with claim 11 wherein said back panel comprises:
 a first portion back panel affixed to the straight upper portions of said frame members;
 a transition panel, having a grab aperture, attached to said transition portions of said frame members; and
 a second portion back panel affixed to the straight lower portions of said frame members.

* * * * *